No. 790,366.

Patented May 23, 1905.

UNITED STATES PATENT OFFICE.

KARL HEINTZEL, OF LÜNEBURG, AND EDUARD CRAMER, OF BERLIN, GERMANY.

METHOD OF IMPROVING GYPSUM MORTAR AND UTILIZING DEAD-BURNT GYPSUM.

SPECIFICATION forming part of Letters Patent No. 790,366, dated May 23, 1905.

Application filed November 26, 1904. Serial No. 234,349.

*To all whom it may concern:*

Be it known that we, KARL HEINTZEL, residing at Lüneburg, and EDUARD CRAMER, residing at 65 Wilhelmshavenerstrasse, Berlin, in the German Empire, subjects of the Emperor of Germany, have invented a new and useful Method of Improving Gypsum Mortar and Utilizing Dead-Burnt Gypsum; and we do hereby declare that the following is a full, clear, and exact description of the invention, which will enable others skilled in the art to which it appertains to make and use the same.

By "gypsum mortar" is understood gypsum which is calcined at a red heat. It possesses the property of setting slowly and is used for stucco-work with a small admixture of water. A distinct disadvantage attaching to its use for floors and freestone structures and as a building-mortar resides in the slight initial hardening which takes place in the first few days after the work is completed. This disadvantage is overcome if the setting of the gypsum is effected under the action of an acid sulfate of an alkaline salt—such, for example, as bisulfate of potassium or sodium. An addition of a quarter per cent. of the salt suffices to effect a powerful binding and hardening of the gypsum. The addition can be made either by grinding the solid salt simultaneously with the burnt gypsum or by mixing the powdered salt to the ground gypsum or by adding the salt to the water with which the gypsum is made up. The following illustrations show the action of the added material.

Tests made with ordinary mortar-gypsum made up with twenty per cent. of water resulted as follows: one day, one kilogram per square centimeter strength; three days, 1.8 kilograms per square centimeter strength; seven days, 5.9 kilograms per square centimeter strength; twenty-eight days, 11.1 kilograms per square centimeter strength.

Tests made with gypsum to which one-quarter per cent. of potassium bisulfate had been added resulted, however, as follows: one day, five kilograms per square centimeter strength; three days, 14.9 kilograms per square centimeter strength; seven days, 24.6 kilograms per square centimeter strength; twenty-eight days, thirty-two kilograms per square centimeter strength.

The acid sulfates of the alkaline salts have a like favorable result upon so-called "deadburnt" gypsum, which has hitherto been useless for the manufacture of mortar and similar products. In this case tests upon six-months-old samples show a strength amounting to as much as thirty-one kilograms per square centimeter.

The practical value of the improvement resides in the fact that gypsum to which bisulfate has been added becomes more than twice as hard as gypsum which is treated under the same conditions with sulfate in the ordinary way.

Example: Gypsum mortar, with thirty parts of water, supports after three days, with an addition of one-fourth per cent. of bisulfate, 8.41 kilograms per square centimeter; seven days, 12.41 kilograms per square centimeter; twenty-eight days, 23.78 kilograms per square centimeter; with an addition of one-fourth per cent. of sulfate, after three days, 3.48 kilograms per square centimeter; seven days, 6.70 kilograms per square centimeter; twenty-eight days, 10.60 kilograms per square centimeter.

Having now particularly described and ascertained the nature of our said invention and in what manner the same is to be performed, we declare that what we claim is—

A method of improving gypsum mortar and utilizing dead-burnt gypsum consisting in adding thereto acid sulfates of the alkaline metals.

KARL HEINTZEL.
EDUARD CRAMER.

Witnesses for Karl Heintzel:
BRUNO LION,
F. W. LUTZ.

Witnesses for Eduard Cramer:
WOLDEMAR HAUPT,
HENRY HASPER.